(12) United States Patent
Oda et al.

(10) Patent No.: US 8,600,544 B2
(45) Date of Patent: Dec. 3, 2013

(54) CARRYING DEVICE, CONTROL DEVICE AND PROGRAM

(75) Inventors: Atsushi Oda, Osaka (JP); Mikio Houjou, Higashiosaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 1002 days.

(21) Appl. No.: 12/683,582

(22) Filed: Jan. 7, 2010

(65) Prior Publication Data

US 2010/0179698 A1    Jul. 15, 2010

(30) Foreign Application Priority Data

Jan. 13, 2009 (JP) ................... 2009-005160

(51) Int. Cl.
*G07F 7/00* (2006.01)
(52) U.S. Cl.
USPC .......................................................... 700/213
(58) Field of Classification Search
USPC .......................................................... 700/213
See application file for complete search history.

(56) References Cited

U.S. PATENT DOCUMENTS 3,978,811 A * 9/1976 Angus et al. ................... 114/245
2003/0193522 A1   10/2003 Chandhoke

FOREIGN PATENT DOCUMENTS

| EP | 1900806 A1 | 3/2008 |
|---|---|---|
| JP | 58-172709 A | 10/1983 |
| JP | 04-100123 A | 4/1992 |
| JP | 2007-209256 A | 8/2007 |
| WO | WO01/27635 A1 | 4/2001 |
| WO | WO2007/001002 A1 | 1/2007 |

* cited by examiner

*Primary Examiner* — Ramya Burgess
(74) *Attorney, Agent, or Firm* — Marvin A. Motsenbocker; Mots Law, PLLC

(57) ABSTRACT

The carrying device comprises a carrying mechanism carrying a fluid vessel containing liquid, a detection device detecting depth information changing with depth of the liquid in the fluid vessel, and a control device controlling the carrying mechanism. The control device comprises: an information acquisition unit acquiring the depth information detected by the detection device; a computing unit calculating a maximum value of an acceleration which can be given to the fluid vessel when carried based on the depth information acquired by the information acquisition unit; and a carry command unit giving the carrying mechanism a command for carrying the fluid vessel at acceleration of the maximum value or smaller. The computing unit calculates a greater value as the maximum value of the acceleration as the depth of the liquid in the fluid vessel increases, and a smaller value as the maximum value of the acceleration as the depth of the liquid in the fluid vessel decreases.

6 Claims, 14 Drawing Sheets

CARRYING DEVICE, CONTROL DEVICE AND PROGRAM

The application Number 2009-005160, upon which this patent application is based, is hereby incorporated by reference.

BACKGROUND OF THE INVENTION

1. Field of the Invention

The present invention relates to a carrying device for carrying a fluid vessel containing a liquid such as culture fluid or the like, and to a control device and a program associated with the carrying device.

2. Description of Related Art

Conventionally, some culture apparatuses such as an incubator or the like include a carrying device for carrying a fluid vessel stored in the culture apparatus. The incubator controls a culture environment in which cells are cultured. In particular, the culture apparatus is provided with a stocker which can contain a plurality of fluid vessels, a carrying device which can carry the fluid vessel both in a horizontal direction and in a vertical direction, and an observation device for observing a sample in the fluid vessel. It is possible that the carrying device takes out the fluid vessel from the stocker and carries the fluid vessel to a position where an observation is executed by the observation device. Also, it is possible that the carrying device returns the fluid vessel into the stocker after completion of the observation.

Also, conventionally, a cell is contained in the fluid vessel along with the liquid such as culture fluid or the like for culturing the cell by the culture apparatus and observing the cultured cell. Methods of observing the cell in the liquid include a method of setting a coordinate system in the fluid vessel, specifying a position of the cell in the fluid vessel by means of a position in the coordinate system, and repeatedly observing the cell existing at the same position in the coordinate system. With this method, even in the case where the fluid vessel is once returned into the stocker, the same cell can be observed again in a next observation.

In the case where the fluid vessel is carried in the horizontal direction by the carrying device, the liquid in the fluid vessel has a wave in accordance with acceleration of the fluid vessel, and the liquid in the fluid vessel vibrates. Therefore, to the cell floating in the liquid, since it moves from its original position during carrying the fluid vessel, it was difficult to adopt the observation method described above.

In contrast, to the cell adhering to a bottom surface of the fluid vessel, since it hardly moves from its original position even during carrying the fluid vessel, it was easier to adopt the observation method described above.

However, the smaller a depth of the liquid is, the larger the vibration of the liquid in vicinity of the bottom surface of the fluid vessel where the cell adheres becomes. Therefore, in the case where the fluid vessel is carried at a uniform acceleration regardless of the depth of the liquid in the fluid vessel, in the fluid vessel containing the liquid a depth of which is small, the vibration of the liquid in vicinity of the bottom surface is large, and it is possible that the cell adhering to the bottom surface is removed therefrom due to the vibration.

If the cell is removed from the bottom surface, the cell is displaced from a position where the cell was adhering, and therefore, it is difficult to repeatedly observe the same cell by the observation method described above. Also, if the cell is removed from the bottom surface, it is possible that culture of the cell is prevented.

SUMMARY OF THE INVENTION

In view of above described problem, an object of the present invention is to provide a carrying device capable of carrying a fluid vessel quickly while inhibiting vibration of a liquid existing in vicinity of a bottom surface of the fluid vessel.

A first carrying device according to the present invention comprises a carrying mechanism carrying a fluid vessel containing a liquid, a detection device detecting depth information changing in accordance with a depth of the liquid in the fluid vessel, and a control device controlling the carrying mechanism. The control device comprises an information acquisition unit acquiring the depth information detected by the detection device, a computing unit calculating a maximum value of an acceleration which can be given to the fluid vessel during carrying the fluid vessel based on the depth information acquired by the information acquisition unit, and a carry command unit giving the carrying mechanism a command for carrying the fluid vessel at an acceleration of not greater than the maximum value of the acceleration, the computing unit calculates a greater value as the maximum value of the acceleration as the depth of the liquid in the fluid vessel increases, and calculates a smaller value as the maximum value of the acceleration as the depth of the liquid in the fluid vessel decreases.

According to the first carrying device described above, calculated in accordance with the depth of the liquid in the fluid vessel is the maximum value of the acceleration at which vibration of the liquid existing in vicinity of a bottom surface of the fluid vessel can be inhibited. The carrying mechanism is controlled by the control device so that the acceleration of the fluid vessel during carrying the fluid vessel is not greater than the maximum value, and therefore, the liquid existing in vicinity of the bottom surface of the fluid vessel hardly vibrates even in the case of carrying the fluid vessel containing the liquid the depth of which is small.

In the case where the acceleration of the fluid vessel during carrying the fluid vessel is equalized under control of the control device with the maximum value of the acceleration at which the vibration of the liquid can be inhibited, movement time of the fluid vessel is shortened, whereby it is possible to carry the fluid vessel quickly.

Further, a configuration in which the maximum value of the acceleration calculated by the computing unit of the control device becomes larger as the depth of the liquid in the fluid vessel becomes larger is based on a phenomenon that the larger the depth of the liquid in the fluid vessel is, the more hardly the vibration of the liquid existing in vicinity of the bottom surface of the fluid vessel occurs. With this configuration, it is possible to carry the fluid vessel more quickly as the depth of the liquid in the fluid vessel becomes larger.

A second carrying device according to the present invention is the first carrying device described above, wherein the detection device comprises a weight sensor, and a weight of the liquid measured by the weight sensor is detected as the depth information. With the second carrying device, the larger the depth of the liquid is, the larger the weight of the liquid is, while the smaller the depth of the liquid is, the smaller the weight of the liquid is. Therefore, by using the weight of the liquid as the depth information, it is possible to carry the fluid vessel in accordance with the depth of the liquid.

A third carrying device according to the present invention is the first carrying device described above, wherein the detection device comprises an imaging device, and the imaging device images the liquid in the fluid vessel from a side, whereby an image showing the bottom surface of the fluid vessel and a surface of the liquid is detected as the depth information. With the third carrying device, the larger the depth of the liquid is, the larger a distance between the bottom surface of the fluid vessel and the surface of the liquid is, while the smaller the depth of the liquid is, the smaller a distance between the bottom surface of the fluid vessel and the surface of the liquid is. Therefore, by using the image as the depth information, it is possible to carry the fluid vessel in accordance with the depth of the liquid.

A fourth carrying device according to the present invention is any of the first to third carrying devices described above, wherein the carrying mechanism carries the fluid vessel along a plane comprising a first axis and a second axis intersecting the first axis. In the case of carrying the fluid vessel between two points on the plane from one point to the other point, based on a first axis direction component and a second axis direction component of an acceleration vector from the one point to the other point having a magnitude of the maximum value of the acceleration, the carry command unit of the control device gives the carrying mechanism a command for carrying the fluid vessel in a first axis direction at the acceleration of not greater than the first axis direction component, while carrying the fluid vessel in a second axis direction at the acceleration of not greater than the second axis direction component.

With the fourth carrying device described above, the fluid vessel moves in the plane comprising the first axis and the second axis. In the case where the fluid vessel moves between two points on the plane from one point to the other point, under control of the control device, the fluid vessel moves in the first axis direction at the acceleration of not greater than the first axis direction component of the acceleration vector, while the fluid vessel moves in the second axis direction at the acceleration of not greater than the second axis direction component of the acceleration vector. Therefore, a maximum value of the acceleration at which the fluid vessel moves from one point to the other point does not exceed the maximum value of the acceleration calculated by the computing unit.

Accordingly, even in the case where the fluid vessel containing the liquid the depth of which is small is carried in the plane by the carrying mechanism, the liquid existing in vicinity of the bottom surface of the fluid vessel hardly vibrates.

A control device according to the present invention is a control device for controlling a carrying mechanism carrying a fluid vessel containing a liquid, and comprises an information acquisition unit acquiring a depth information changing in accordance with a depth of the liquid in the fluid vessel, a computing unit calculating a maximum value of an acceleration which can be given to the fluid vessel during carrying the fluid vessel based on the depth information acquired by the information acquisition unit, and a carry command unit giving the carrying mechanism a command for carrying the fluid vessel at an acceleration of not greater than the maximum value of the acceleration. The computing unit calculates a greater value as the maximum value of the acceleration as the depth of the liquid in the fluid vessel increases, and calculates a smaller value as the maximum value of the acceleration as the depth of the liquid in the fluid vessel decreases.

A program according to the present invention is a program for controlling a carrying mechanism carrying a fluid vessel containing a liquid. The program makes a computer acquire depth information changing in accordance with a depth of the liquid in the fluid vessel, calculate a maximum value of an acceleration which can be given to the fluid vessel during carrying the fluid vessel based on the depth information acquired, and give the carrying mechanism a command for carrying the fluid vessel at an acceleration of not greater than the maximum value of the acceleration. The computer calculates a greater value as the maximum value of the acceleration as the depth of the liquid in the fluid vessel increases, and calculates a smaller value as the maximum value of the acceleration as the depth of the liquid in the fluid vessel decreases.

DETAILED DESCRIPTION OF THE PREFERRED EMBODIMENT

In the case where a fluid vessel moves between two points on a plane from one point to the other point, if an acceleration of the fluid vessel in a direction from the one point to the other point is large, vibration of a liquid in vicinity of a bottom surface of the fluid vessel is large. Therefore, it is possible that a cell adhering to the bottom surface of the fluid vessel is removed therefrom due to the vibration. In view of this, it is necessary to control the acceleration of the fluid vessel in the direction from the one point to the other point to not greater than a maximum value of the acceleration at which the cell is hardly removed from the bottom surface of the fluid vessel.

In a preferred embodiment discussed in detail below with reference to drawings, a carrying device according to the present invention is provided to an observation unit.

1. Configuration of Observation Unit

Figure 1:
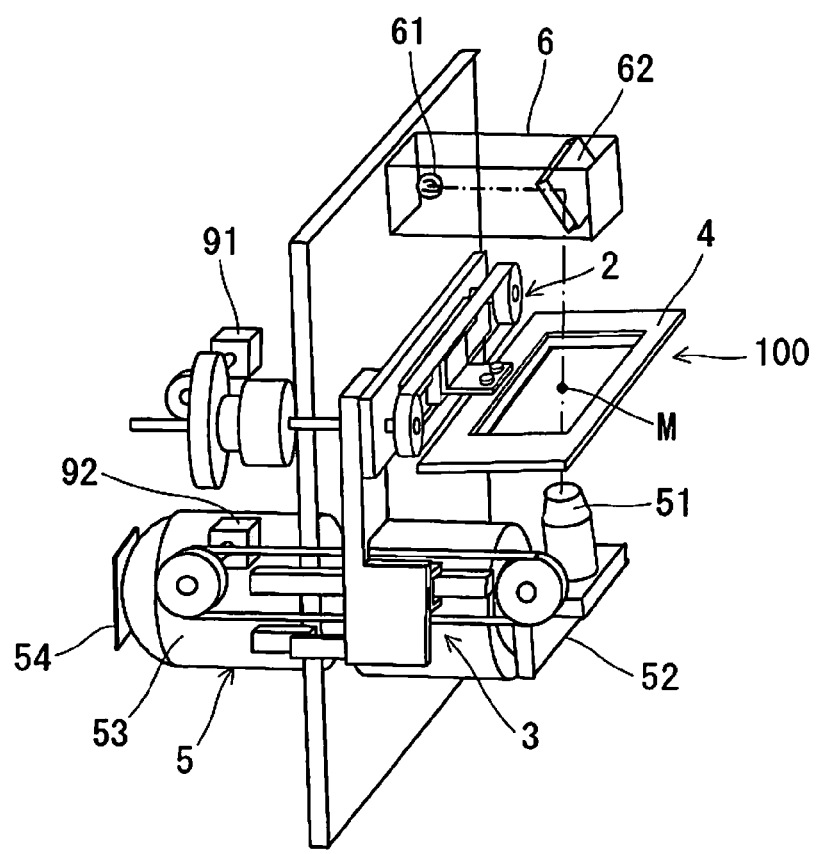
FIG. 1 is a perspective view of an observation unit provided with a carrying device according to an embodiment of the present invention.

FIG. 1 is a perspective view of an observation unit provided with a carrying device 100 according to the embodiment of the present invention. As shown in FIG. 1, the observation unit is provided with an observation device 5 and an illuminating device 6 in addition to the carrying device 100 according to the embodiment of the present invention.

The observation device 5 is a phase-contrast microscope and comprises an objective lens 51 forming an enlarged image of a sample which is to be observed, a reflective mirror 52 guiding the enlarged image formed by the objective lens 51 to a zoom lens 53, the zoom lens 53 further enlarging the enlarged image of the sample, and a CCD (Charge Coupled Device) camera 54 imaging an observation image enlarged by the zoom lens 53.

The illuminating device 6 comprises an LED (Light Emitting Diode) 61 emitting light and a reflective mirror 62 reflecting light emitted by the LED 61 vertically downward. The illuminating device 6 is arranged above the observation device 5, and the reflective mirror 62 is arranged so that the reflected light enters the objective lens 51 of the observation device 5.

A position through which the light reflected by the reflective mirror 62 passes in an X-Y plane in which a placing table 4 can move is an observation point M where the sample is observed by the observation device 5.

Figure 2:
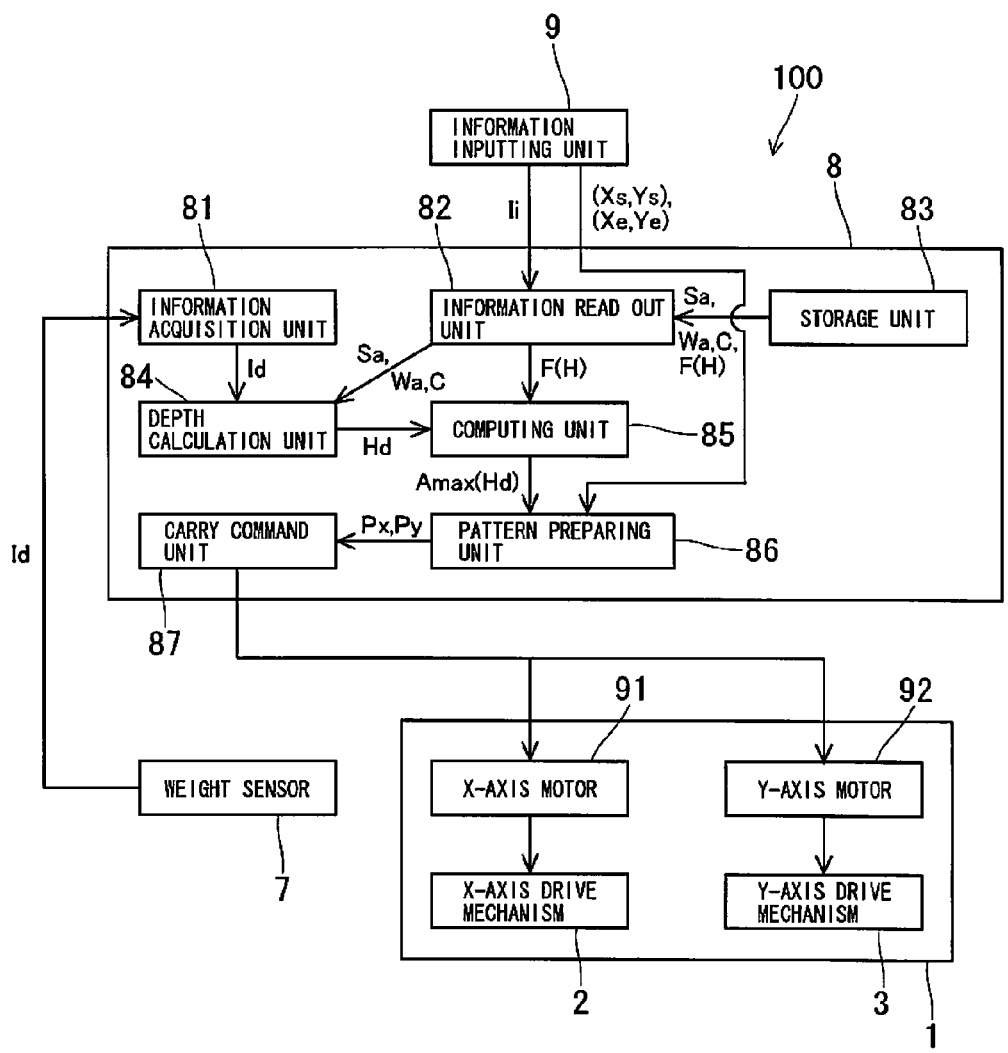
FIG. 2 is a block diagram showing a configuration of the carrying device.

FIG. 2 is a block diagram showing a configuration of the carrying device 100. As shown in FIG. 2, the carrying device 100 comprises a carrying mechanism 1 for carrying a fluid vessel A, a weight sensor 7, and a control device 8 controlling the carrying mechanism 1. The fluid vessel A contains the sample such as a cell or the like as well as a liquid such as culture fluid or the like.

Figure 3:
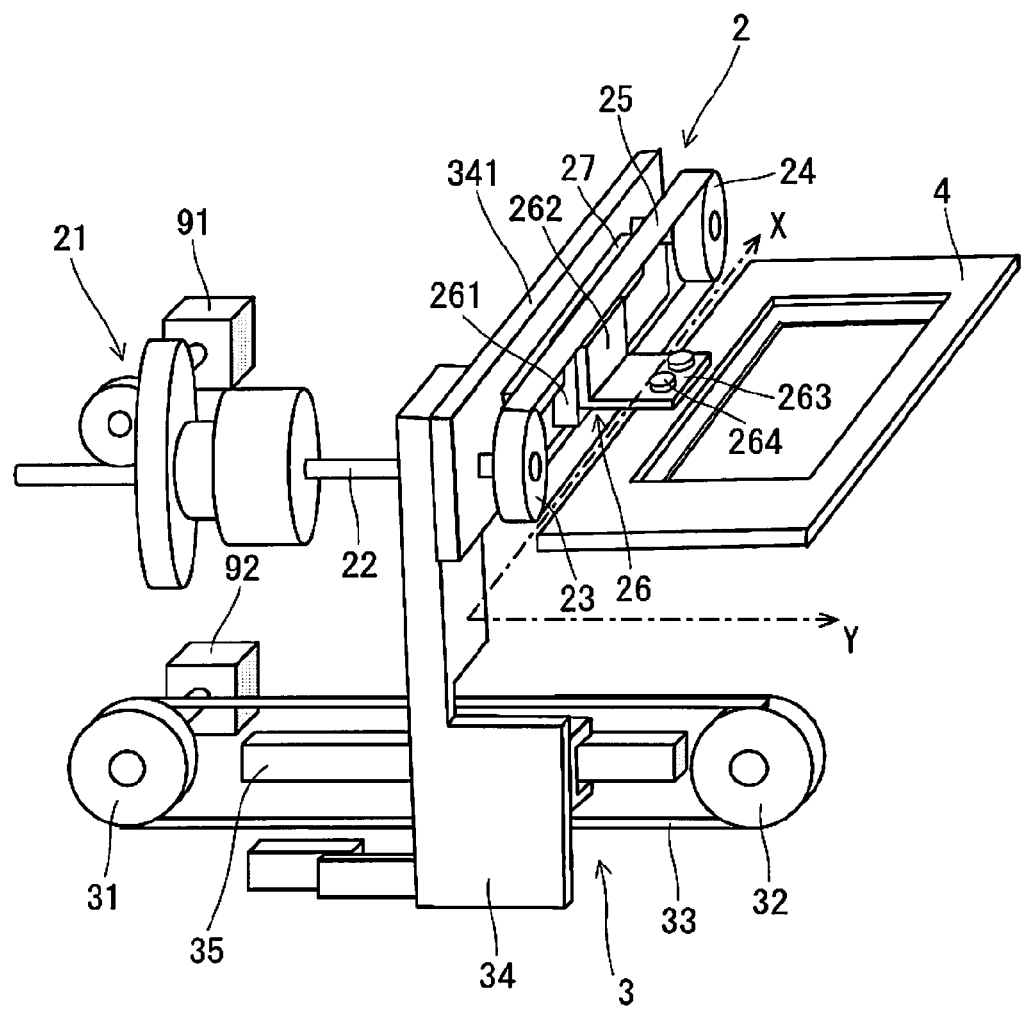
FIG. 3 is a perspective view of a carrying mechanism provided to the carrying device.

FIG. 3 is a perspective view showing a configuration of the carrying mechanism 1. As shown in FIG. 3, the carrying mechanism 1 comprises the placing table 4 on which the fluid vessel A is placed, an X-axis drive mechanism 2 for moving the placing table 4 in an X-axis direction, a Y-axis drive mechanism 3 for moving the placing table 4 in a Y-axis direction, an X-axis motor 91 driving the X-axis drive mechanism 2, and a Y-axis motor 92 driving the Y-axis drive mechanism 3. The X-axis direction and the Y-axis direction are two directions perpendicular to each other within a horizontal plane.

The Y-axis drive mechanism 3 comprises a pair of pulleys 31, 32, a timing belt 33, a Y-axis slide body 34 having an inverted L-shape, and a guiding member 35, as shown in FIG. 3. One pulley 31 of the pair of pulleys 31, 32 is fixed to a rotation axis of the Y-axis motor 92, and the one pulley 31 rotates around the rotation axis of the Y-axis motor 92 in accordance with rotation of the Y-axis motor 92.

The other pulley 32 is rotatably arranged at a position displaced from the position of the one pulley 31 in the Y-axis direction.

The timing belt 33 is entrained about the pair of pulleys 31, 32. The Y-axis slide body 34 is coupled to the timing belt 33 at a position between the pair of pulleys 31, 32, and an upper side part 341 of the Y-axis slide body 34 is located along the x-axis direction in a space where the placing table 4 is arranged. Also, the Y-axis slide body 34 is slidably coupled to the guiding member 35, and therefore, a path on which the Y-axis slide body 34 can move is defined along the Y-axis direction.

When the one pulley 31 rotates, the timing belt 33 thereby rotates. At this time, a part of the timing belt 33 which is located between the pair of pulleys 31, 32 moves along the Y-axis direction, and therefore, rotational motion of the one pulley 31 is converted into translational motion in the Y-axis direction by the timing belt 33.

Accordingly, rotational force of the Y-axis motor 92 is converted into translational force in the Y-axis direction by the Y-axis drive mechanism 3 to be given to the Y-axis slide body 34. As a result, the Y-axis slide body 34 moves along the Y-axis direction.

As shown in FIG. 3, the X-axis drive mechanism 2 comprises a gear mechanism 21, a shaft 22 extending in the Y-axis direction, a pair of pulleys 23, 24, a timing belt 25, an X-axis slide body 26, and a guiding member 27.

The gear mechanism 21 converts rotational force of the X-axis motor 91 into rotational force around a center axis of the shaft 22 to give the converted rotational force to the shaft 22. The shaft 22 is rotatably supported on the upper side part 341 of the Y-axis slide body 34 of the Y-axis drive mechanism 3, and is rotated around the center axis by the rotational force given by the gear mechanism 21. The shaft 22 is slidable with respect to the gear mechanism 21.

One pulley 23 of the pair of pulleys 23, 24 is fixed to one end of the shaft 22, and the one pulley 23 rotates around the axis shared with the shaft 22 in accordance with rotation of the shaft 22.

The other pulley 24 is rotatably attached to the upper side part 341 of the Y-axis slide body 34 at a position displaced from the position of the one pulley 23 in the x-axis direction.

The timing belt 25 is entrained about the pair of pulleys 23, 24. The X-axis slide body 26 is coupled to the timing belt 25 at a position between the pair of pulleys 23, 24.

The X-axis slide body 26 comprises a sliding part 261 and an L-shaped section 262 fixed to a front surface of the sliding part 261. The sliding part 261 is slidably engaged with the guiding member 27, and therefore, a path on which the sliding part 261 can move is defined along the X-axis direction.

Figure 4:
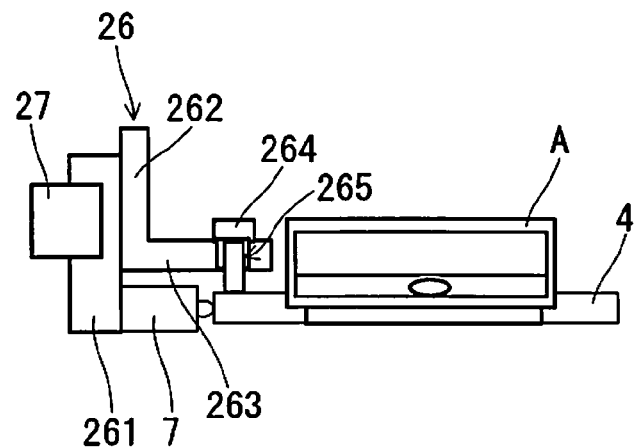
FIG. 4 is a vertical cross-sectional view showing an arrangement of a weight sensor provided to the carrying device.

FIG. 4 is a vertical cross-sectional view showing attachment of the placing table 4 and arrangement of the weight sensor 7. As shown in FIG. 4, the placing table 4 is coupled to a lower side part 263 of the L-shaped section 262 of the X-axis slide body 26 by a coupling member 264 having a T-shape. In particular, the lower side part 263 of the L-shaped section 262 is provided with a through-hole 265. A leg part of the coupling member 264 passes through the through-hole 265, while a head part of the coupling member 264 abuts against a top surface of the lower side part 263 of the L-shaped section 262. Also, the placing table 4 is fixed to a bottom end part of the leg part of the coupling member 264.

When the one pulley 23 of the pair of pulleys 23, 24 rotates, the timing belt 25 thereby rotates. At this time, a part of the timing belt 25 which is located between the pair of pulleys 23, 24 moves along the X-axis direction, and therefore, rotational motion of the one pulley 23 is converted into translational motion in the X-axis direction by the timing belt 25.

Accordingly, rotational force of the X-axis motor 91 is converted into translational force in the X-axis direction by the X-axis drive mechanism 2 to be given to the X-axis slide body 26. As a result, the X-axis slide body 26 moves along the X-axis direction.

Therefore, with the carrying mechanism 1, the placing table 4 coupled to the X-axis slide body 26 is moved along the X-axis direction by rotation of the X-axis motor 91, and is moved along the Y-axis direction by rotation of the Y-axis motor 92 in the X-Y plane comprising the X-axis and the Y-axis.

The weight sensor 7 comprises a strain gauge load cell, and is fixed to the front surface of the sliding part 261 of the X-axis slide body 26 so that an end of the weight sensor 7 is in contact with a side surface of the placing table 4 as shown in FIG. 4. A slight gap is defined between an inner circumferential surface of the through-hole 265 and an outer circumferential surface of the leg part of the coupling member 264, so that when the fluid vessel A is placed on the placing table 4, a power in accordance with a weight of the fluid vessel A acts on the end of the weight sensor 7 with the head part of the coupling member 264 being a fulcrum. The weight of the fluid vessel A is thereby measured by the weight sensor 7.

Figure 5:
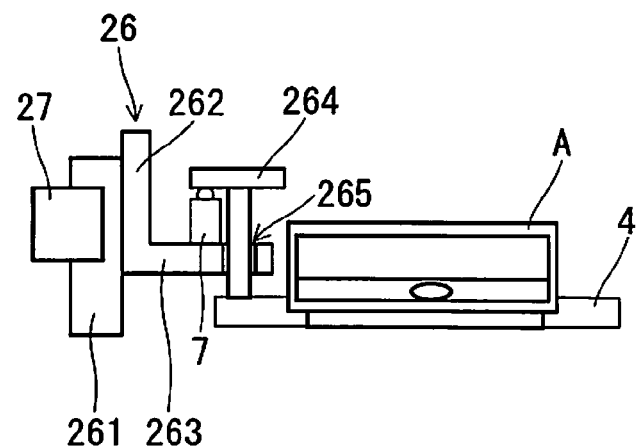
FIG. 5 is a vertical cross-sectional view showing another arrangement of the weight sensor.

As shown in FIG. 5, the weight sensor 7 may be fixed to a top surface of the lower side part 263 of the L-shaped section 262 so that the end of the weight sensor 7 is in contact with a lower surface of the head part of the coupling member 264.

In order to acquire a weight of the liquid contained in the fluid vessel A, a total weight of the fluid vessel A and the liquid contained in the fluid vessel A is measured by the weight sensor 7, and then the weight of the fluid vessel A which is empty is reduced from the measured total weight.

The total weight of the fluid vessel A and the liquid detected by the weight sensor 7 changes in accordance with the depth of the liquid in the fluid vessel A. Therefore, in the carrying device 100 according to this embodiment, the weight sensor 7 forms a detection device detecting depth information (the total weight of the fluid vessel A and the liquid) changing in accordance with a depth H of the liquid in the fluid vessel A.

2. Control of Carrying Device

Figure 6:
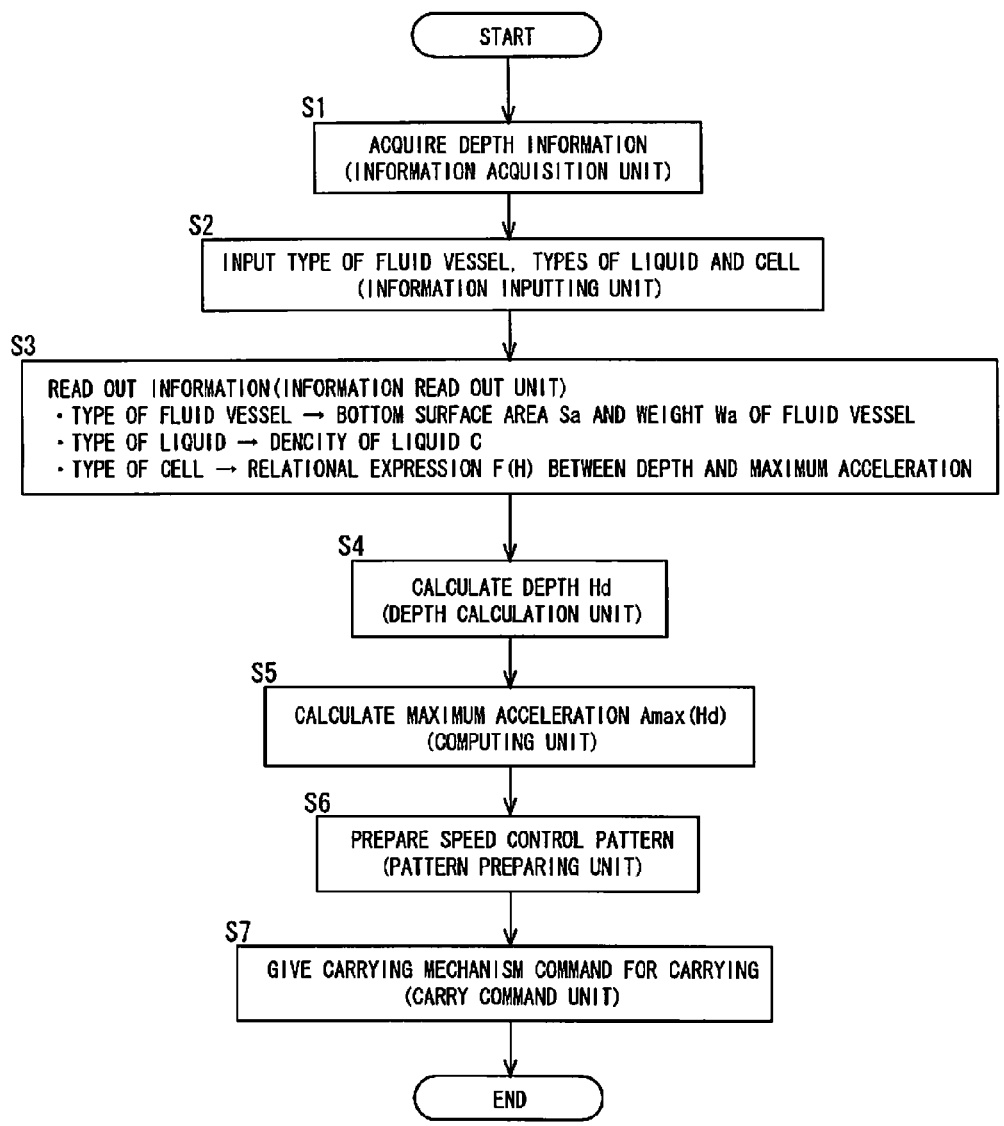
FIG. 6 is a flow chart for controlling the carrying mechanism provided to the carrying device.

As shown in FIG. 2, the control device 8 is connected to the carrying mechanism 1 and the weight sensor 7 described above, while an information inputting unit 9 such as a personal computer, a key board, a touch panel, a mouse or the like is connected to the control device 8. The control device 8 comprises an information acquisition unit 81, an information read out unit 82, a storage unit 83, a depth calculation unit 84, a computing unit 85, a pattern preparing unit 86, and a carry command unit 87. The control device 8 controls the carrying mechanism 1 in accordance with a flow chart shown in FIG. 6.

The control device 8 may be configured by a CPU (Central Processing Unit), a dedicated LSI (Large Scale Integration), a personal computer and the like. For example, the control device 8 comprising the information acquisition unit 81, the computing unit 85, and the carry command unit 87 may be formed by the personal computer. Also, functions of each unit 81 to 87 of the control device 8 can be performed by execution of a program.

Following is an explanation of a case where a cell is contained in the fluid vessel A as the sample along with the liquid.

Figure 7:
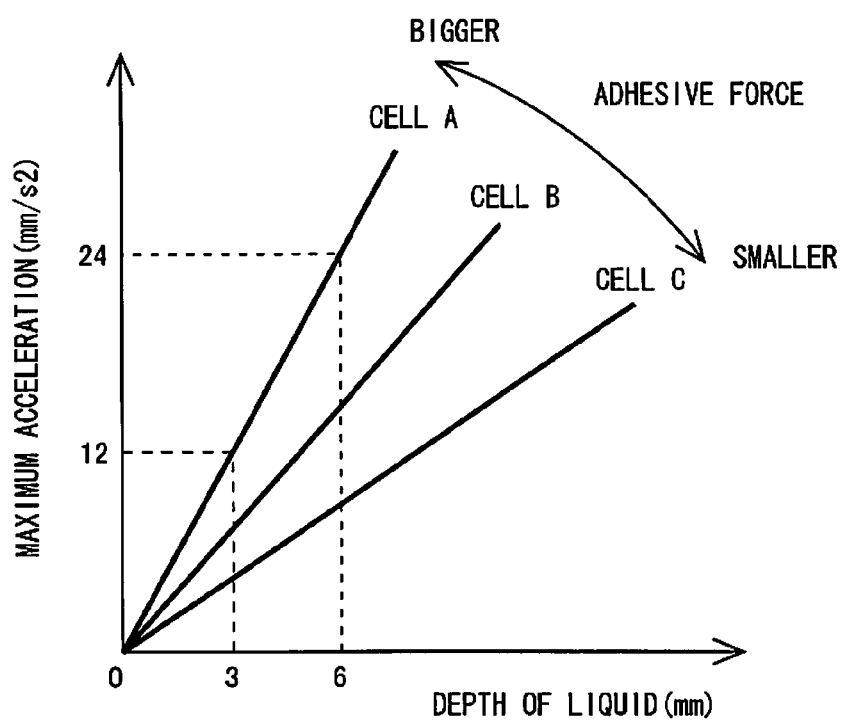
FIG. 7 is a view showing in a graph a relation between a depth of a liquid and a maximum acceleration for each cell type.

In the storage unit 83 of the control device 8, stored are a bottom surface area Sa and a weight Wa of the fluid vessel A, associated with a type of the fluid vessel A; a density C of the liquid, associated with a type of the liquid; and a relational expression F(H) between the depth H of the liquid and a maximum acceleration Amax, associated with the type of the cell as shown in FIG. 7.

Here, the maximum acceleration is a maximum value of the acceleration which can be given to the fluid vessel A during carrying the fluid vessel A. In this embodiment, the maximum acceleration is a maximum value of the acceleration at which the cell adhering to a bottom surface of the fluid vessel A is hardly removed from the bottom surface during carrying the fluid vessel A. An adhesive force of the cell to the bottom surface varies depending on the type of the cell. Therefore, even if the depth of the liquid is the same, when the type of the cell is different, the maximum acceleration is also different. In particular, as shown in FIG. 7, as the adhesive force of the cell becomes smaller in the order of a cell A, a cell B, and a cell C, the cell is more easily removed from the bottom surface, and therefore, an inclination of the maximum acceleration Amax to the depth H of the liquid becomes smaller.

In the case where the fluid vessel A is moved in the X-Y plane by the carrying mechanism 1, along with acceleration of the fluid vessel A, the liquid in the fluid vessel A has a wave and the liquid in the fluid vessel A vibrates. At this time, the larger the depth of the liquid is, the smaller the vibration of the liquid in vicinity of the bottom surface of the fluid vessel A where the cell adheres becomes, while the smaller the depth of the liquid is, the larger the vibration of the liquid in vicinity of the bottom surface of the fluid vessel A where the cell adheres becomes. Therefore, as shown in FIG. 7, the larger the depth of the liquid is, the larger the maximum acceleration becomes, while the smaller the depth of the liquid is, the smaller the maximum acceleration becomes.

Here, although FIG. 7 shows a case where the relational expression F(H) is a linear function, the relational expression F(H) is not limited to this, and may be a quadratic function or function of any higher order, for example.

First, in step S1 (FIG. 6), the control device 8 uses the information acquisition unit 81 as shown in FIG. 2 to acquire the total weight of the fluid vessel A and the liquid as depth information Id from the weight sensor 7. The depth information Id (the total weight of the fluid vessel A and the liquid) acquired from the weight sensor 7 is given to the depth calculation unit 84 of the control device 8.

Then in step S2, a type of the fluid vessel A and types of the liquid and the cell contained in the fluid vessel A are inputted by the information inputting unit 9. Information Ii inputted in the control device 8 by the information inputting unit 9 is given to the information read out unit 82 of the control device 8 as shown in FIG. 2.

In the case where the information inputting unit 9 is the personal computer, the information Ii is given to the control device 8 by means of character entry from the personal computer.

The information read out unit 82 may be a reading unit reading a QR (Quick Response) code or an RF-ID (Radio Frequency Identification). In this case, by giving the information Ii described above to the QR code or the RF-ID, the information Ii can be given to the control device 8 only by reading the QR code or the RF-ID by the reading unit.

The QR code and the RF-ID are attached to the fluid vessel A, for example. A camera is used as the reading unit when the QR code is read, and a reader antenna is used as the reading unit when the RF-ID is read.

In step S3, the control device 8 uses the information read out unit 82 as shown in FIG. 2 to read out from the storage unit 83 the bottom surface area Sa and the weight Wa of the fluid vessel A associated with the type of the fluid vessel A inputted in step S2, as well as density C of the liquid associated with the type of the liquid inputted in step S2. The bottom surface area Sa, weight Wa of the fluid vessel A, and the density C of the liquid read out from the storage unit 83 are given to the depth calculation unit 84 of the control device 8.

Further, as shown in FIG. 2, the control device 8 uses the information reading unit 82 to read out from the storage unit 83 the relational expression F(H) between the depth H of the liquid and the maximum acceleration Amax associated with the type of the cell inputted in step S2. The relational expression F(H) read out from the storage unit 83 is given to the computing unit 85 of the control device 8.

In step S4, the control device 8 uses the depth calculation unit 84 as shown in FIG. 2 to calculate a depth Hd of the liquid based on the depth information Id (the total weight of the fluid vessel A and the liquid) acquired in step S1, and the bottom surface area Sa and the weight Wa of the fluid vessel A and the density C of the liquid read out in step S3.

In particular, the depth calculation unit 84 of the control device 8 calculates the weight of the liquid by reducing the weight Wa of the fluid vessel A from the total weight of the fluid vessel A and the liquid which is the depth information Id, then calculates a volume of the liquid by dividing the calculated weight of the liquid by the density C of the liquid, and then, calculates the depth Hd of the liquid by dividing the calculated volume of the liquid by the bottom surface area Sa of the fluid vessel A. The depth Hd of the liquid calculated by the depth calculation unit 84 is given to the computing unit 85.

In step S5, the control device 8 uses the computing unit 85 to calculates the maximum acceleration Amax(Hd) based on the relational expression F(H) read out in step S3 and the depth Hd of the liquid calculated in step S4.

In particular, the computing unit 85 of the control device 8 calculates the maximum acceleration Amax(Hd) corresponding to the depth Hd of the liquid calculated in step S4 from the relational expression F(H) between the depth H of the liquid and the maximum acceleration Amax shown in FIG. 7. As described above (and as shown in FIG. 7), the depth H of the liquid and the maximum acceleration Amax have a relation in which the larger the depth H of the liquid is, the larger the maximum acceleration Amax becomes, while the smaller the depth H of the liquid is, the smaller the maximum acceleration Amax becomes. Therefore, the larger the depth Hd of the liquid calculated in step S4 is, the larger the maximum acceleration Amax(Hd) calculated in step S5 becomes, while the smaller the depth Hd of the liquid calculated in step S4 is, the smaller the maximum acceleration Amax(Hd) calculated in step S5 becomes.

For example, as to the cell A, in the case where the calculated depth Hd of the liquid is 3 mm, based on the relational expression F(H) shown in FIG. 7, the maximum acceleration Amax(Hd) is calculated to be 12 mm/s$^2$, while in the case where the calculated depth Hd of the liquid is 6 mm, the maximum acceleration Amax(Hd) is calculated to be 24 mm/s$^2$.

The maximum acceleration Amax(Hd) calculated by the computing unit 85 is given to the pattern preparing unit 86 as shown in FIG. 2.

In step S6, the control device 8 uses the pattern preparing unit 86 to prepare a speed control pattern based on the maximum acceleration Amax(Hd) calculated in step S5. Here, the speed control pattern is a function of time representing a change in velocity of the fluid vessel A, which is to be controlled.

Figure 8:
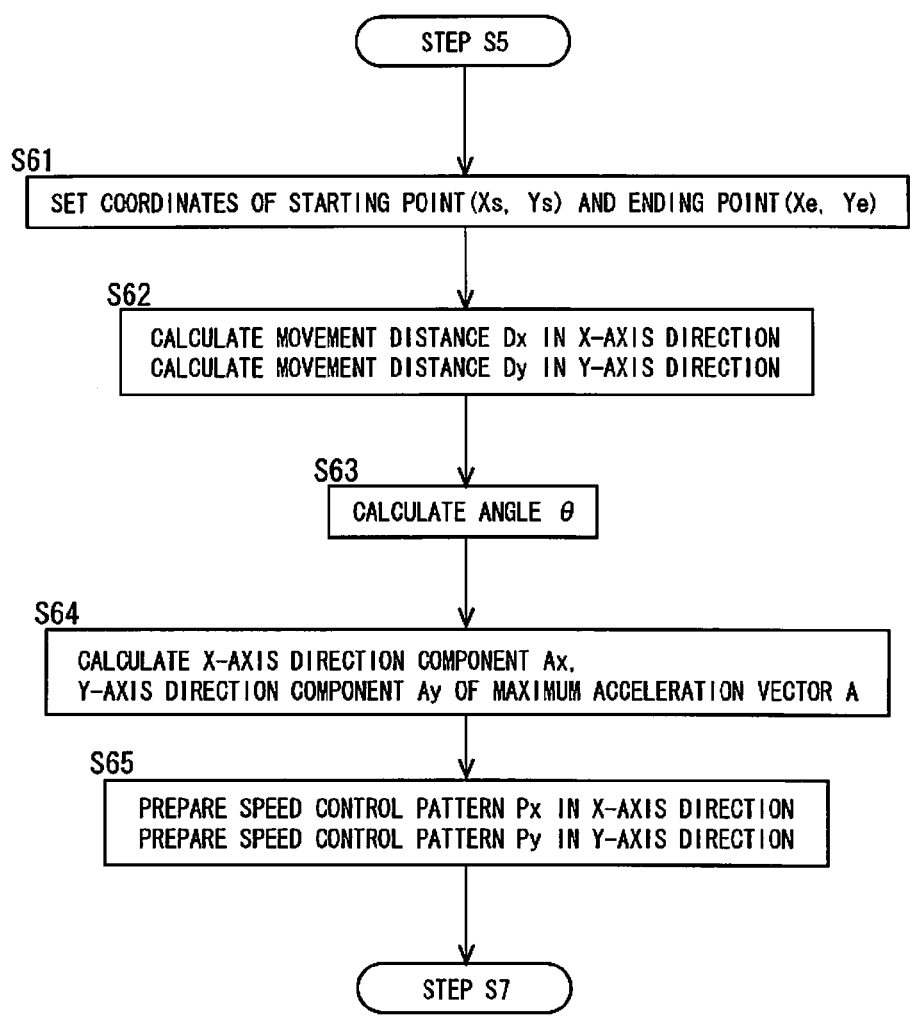
FIG. 8 is a flow chart showing control executed by a pattern preparing unit of a control device provided to the carrying device.
Figure 9:
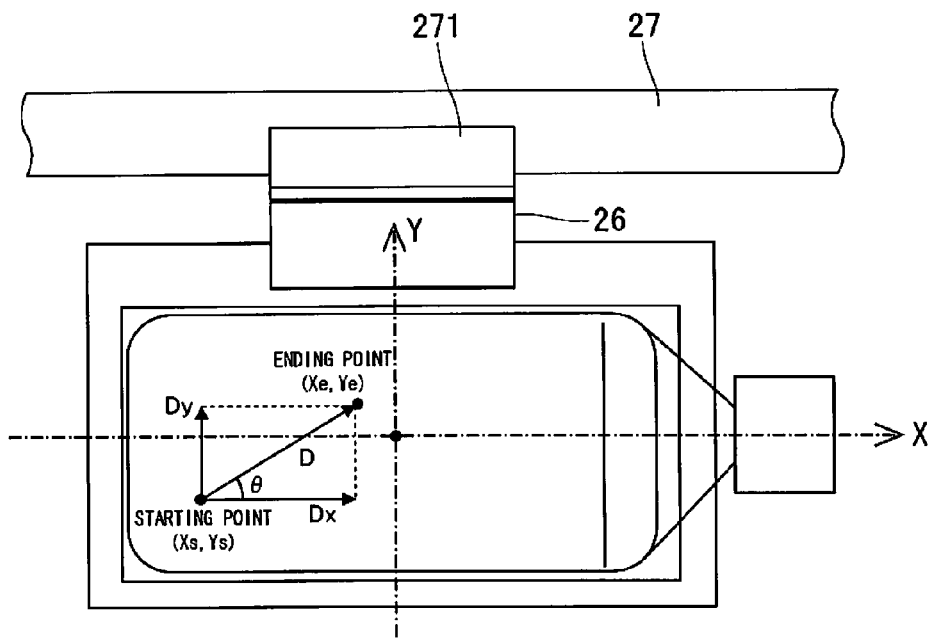
FIG. 9 is a plane view showing a starting point and an ending point of movement of a fluid vessel.
Figure 10:
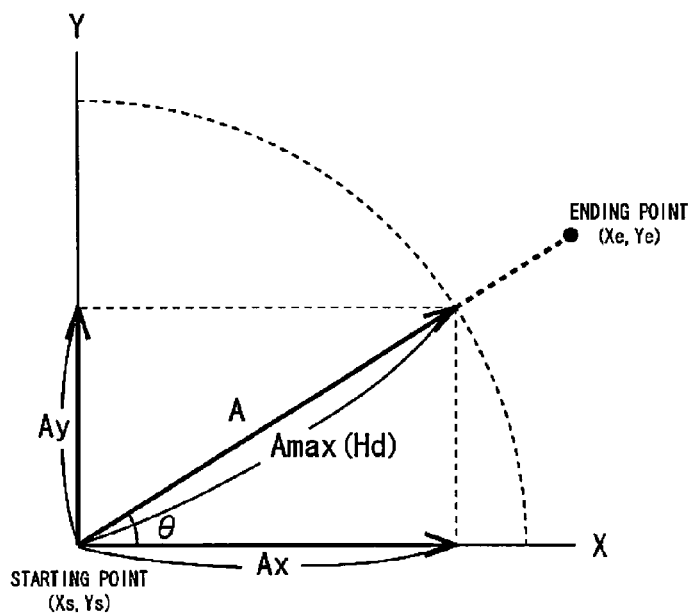
FIG. 10 is a view showing a maximum acceleration vector and an X-axis direction component and Y-axis direction component thereof.

FIG. 8 is a flow chart showing control executed in step S6. FIG. 9 is a plane view showing a starting point (Xs, Ys) and an ending point (Xe, Ye) of movement of the fluid vessel A. And FIG. 10 is a view showing a maximum acceleration vector A from the starting point (Xs, Ys) to the ending point (Xe, Ye) having a magnitude of the maximum acceleration Amax(Hd), and an X-axis direction component Ax and Y-axis direction component Ay thereof.

First, in step S61, the starting point (Xs, Ys) and the ending point (Xe, Ye) (see FIG. 9) for moving the fluid vessel A are inputted by the information inputting unit 9. The starting point (Xs, Ys) and the ending point (Xe, Ye) inputted by the information inputting unit 9 are given to the pattern preparing unit 86 of the control device 8.

In step S62, the pattern preparing unit 86 uses the starting point (Xs, Ys) and the ending point (Xe, Ye) given thereto to calculate (Xe-Xs), thereby calculating a distance Dx which the fluid vessel A moves along the X-axis direction (movement distance in the X-axis direction), while calculate (Ye-Ys), thereby calculating a distance Dy which the fluid vessel A moves along the Y-axis direction (movement distance in the Y-axis direction).

In step S63, the pattern preparing unit 86 calculates an angle θ (see FIG. 9) formed by a displacement vector D (=(Dx, Dy)) from the starting point (Xs, Ys) to the ending point (Xe, Ye) and the X-axis by a formula (1).

$$\theta = \tan^{-1}(Dy/Dx) \quad (1)$$

In step S64, the pattern preparing unit 86 calculates the X-axis direction component Ax and the Y-axis direction component Ay (see FIG. 10) of the maximum acceleration vector A from the starting point (Xs, Ys) to the ending point (Xe, Ye) having a magnitude of the maximum acceleration Amax(Hd) based on the maximum acceleration Amax(Hd) calculated in step S5 and the angle θ calculated in step S63 by a formula (2).

$$Ax = A\max(Hd)\cos(\theta)$$

$$Ay = A\max(Hd)\sin(\theta) \quad (2)$$

Figure 11A:
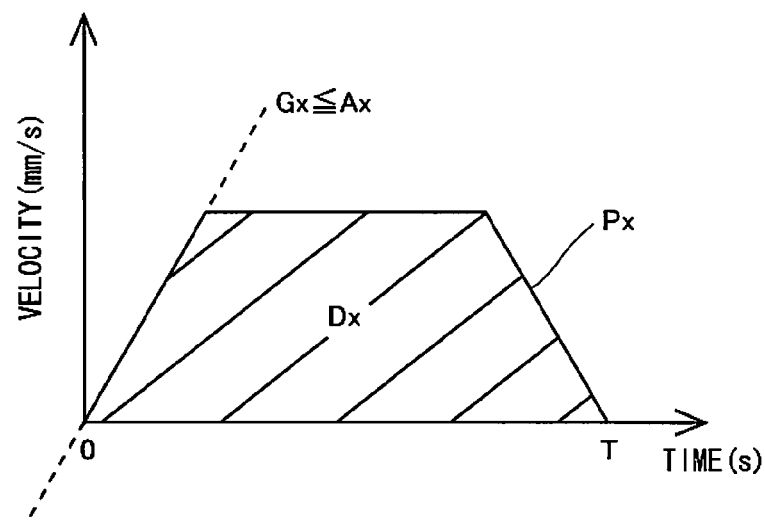
FIG. 11a is a view showing in a graph a speed control pattern in an X-axis direction.
Figure 11B:
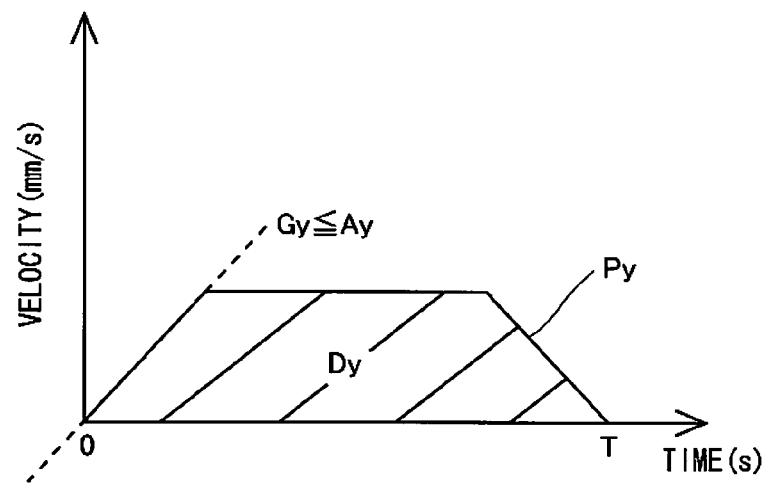
FIG. 11b is a view showing in a graph a speed control pattern in a Y-axis direction.

FIG. 11a and FIG. 11b are views showing in graphs a speed control pattern Px in the X-axis direction and a speed control pattern Py in the Y-axis direction for moving the fluid vessel A from the starting point (Xs, Ys) to the ending point (Xe, Ye). In step S65, as shown in FIGS. 11a and 11b, the pattern preparing unit 86 prepares the speed control pattern Px in the X-axis direction and the speed control pattern Py in the Y-axis direction for moving the fluid vessel A from the starting point (Xs, Ys) to the ending point (Xe, Ye) based on the movement distances Dx, Dy in the X-axis direction and the Y-axis direction calculated in step S62 and the X-axis direction component Ax and the Y-axis direction component Ay of the maximum acceleration vector A calculated in step S64. The FIGS. 11a and 11b show the case where the speed control patterns Px, Py have a trapezoidal shape.

As to be described later, in the case where the fluid vessel A is carried in accordance with the speed control patterns Px, Py, a velocity vector of the fluid vessel A is determined by synthesis of a velocity component in the X-axis direction and a velocity component in the Y-axis direction. Therefore, if the speed control pattern Px in the X-axis direction and the speed control pattern Py in the Y-axis direction are prepared separately and independently, it is possible that the acceleration of the fluid vessel A during moving from the starting point (Xs, Ys) to the ending point (Xe, Ye) exceeds the maximum acceleration Amax(Hd). For example, in the case where a maximum value Gx of an inclination of the speed control pattern Px in the X-axis direction (acceleration in the X-axis direction) is larger than the X-axis direction component Ax of the maximum acceleration vector A, the acceleration of the fluid vessel A during moving from the starting point (Xs, Ys) to the ending point (Xe, Ye) exceeds the maximum acceleration Amax(Hd).

In view of this, the speed control patterns Px, Py are prepared based on the X-axis direction component Ax and the Y-axis direction component Ay of the maximum acceleration vector A, in a manner described below. The speed control pattern Px in the X-axis direction is prepared so that the maximum value Gx of the inclination thereof is not greater than the X-axis direction component Ax of the maximum acceleration vector A, while the speed control pattern Py in the Y-axis direction is prepared so that a maximum value Gy of the inclination thereof is not greater than the Y-axis direction component Ay of the maximum acceleration vector A.

Also, the speed control pattern Px in the X-axis direction is prepared so that a value obtained by integrating a function representing the speed control pattern Px by time matches the movement distance Dx in the X-axis direction, while the speed control pattern Py in the Y-axis direction is prepared so that a value obtained by integrating a function representing the speed control pattern Py by time matches the movement distance Dy in the Y-axis direction.

The speed control pattern Px in the X-axis direction and the speed control pattern Py in the Y-axis direction prepared by the pattern preparing unit 86 are given to the carry command unit 87 as shown in FIG. 2.

After executing step S6, in step S7 (FIG. 6), the carry command unit 87 gives a command to the carrying mechanism 1 based on the speed control pattern Px in the X-axis direction and the speed control pattern Py in the Y-axis direction prepared in step S6. As a result, the fluid vessel A moves in the X-axis direction in accordance with the speed control pattern Px in the X-axis direction prepared in step S6, while moves in the Y-axis direction in accordance with the speed control pattern Py in the Y-axis direction prepared in step S6.

Figure 12:
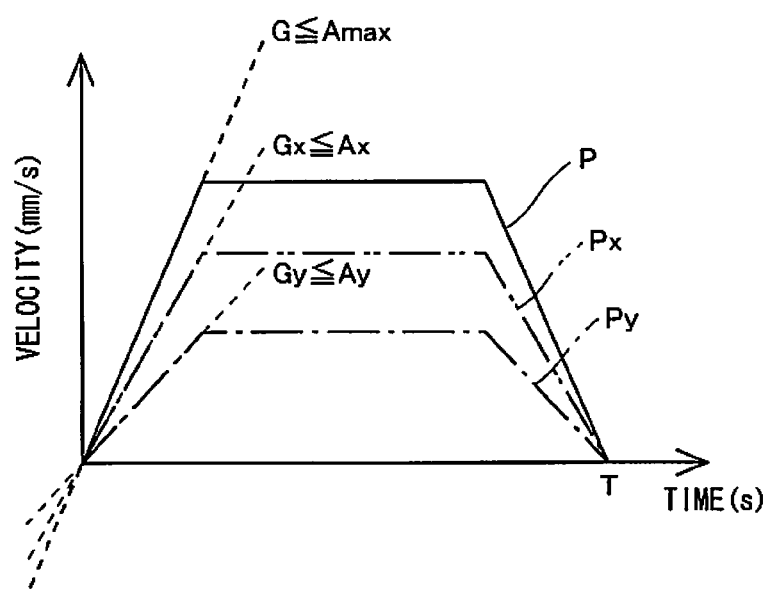
FIG. 12 is a view showing in a graph a change in velocity of the fluid vessel in a direction from the starting point to the ending point.

The velocity of the fluid vessel A in the direction from the starting point (Xs, Ys) to the ending point (Xe, Ye) thereby changes in a trapezoidal shape in accordance with a graph P shown in FIG. 12.

As described above, the speed control pattern Px in the X-axis direction is prepared so that the maximum value Gx of the inclination thereof is not greater than the X-axis direction component Ax of the maximum acceleration vector A, while the speed control pattern Py in the Y-axis direction is prepared so that the maximum value Gy of the inclination thereof is not greater than the Y-axis direction component Ay of the maximum acceleration vector A. Therefore, a maximum value G of the acceleration in the direction from the starting point (Xs, Ys) to the ending point (Xe, Ye) does not exceed the maximum acceleration Amax(Hd) calculated in step S5.

Accordingly, the fluid vessel A is carried from the starting point (Xs, Ys) which is the one point to the ending point (Xe, Ye) which is the other point at an acceleration not greater than the maximum acceleration Amax(Hd).

With the carrying device 100 described above, calculated in accordance with the depth Hd of the liquid in the fluid vessel A is the maximum value of the acceleration (the maximum acceleration Amax(Hd)) at which the cell is hardly removed from the bottom surface of the fluid vessel A, and the carrying mechanism 1 is controlled so that the acceleration of the fluid vessel A during carrying the fluid vessel A is not greater than the maximum acceleration Amax(Hd). Therefore, even in the case of carrying the fluid vessel A containing the liquid the depth Hd of which is small, the cell is hardly removed from the bottom surface of the fluid vessel A.

In the case where the acceleration of the fluid vessel A during carrying the fluid vessel A is equalized with the maximum acceleration Amax(Hd) under control of the control device 8, the movement time T of the fluid vessel A from the starting point (Xs, Ys) to the ending point (Xe, Ye) is shortened, and therefore, it is possible to carry the fluid vessel A quickly.

Also, with the carrying device 100 described above, the larger the depth Hd of the liquid in the fluid vessel A is, the larger the maximum acceleration Amax calculated by the computing unit 85 of the control device 8 (in step S5) becomes, and therefore, it is possible to carry the fluid vessel A quickly.

Figure 13A:
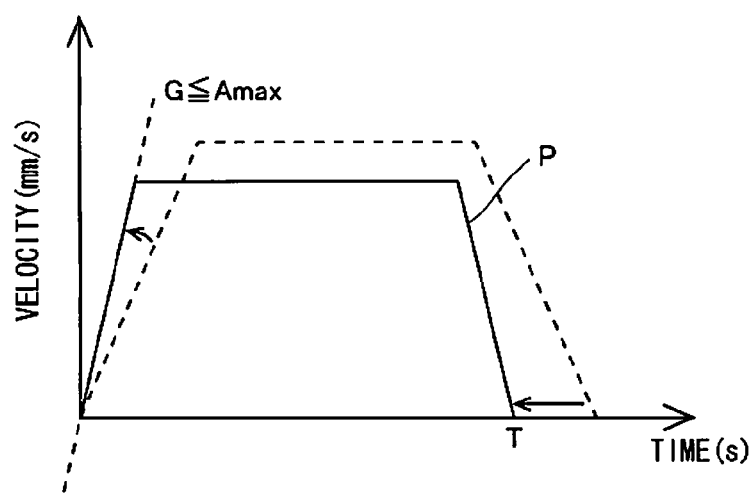
FIG. 13a is a view showing in a graph a change in velocity of the fluid vessel in the case where the depth of the liquid is large.

Thus, in the case where the depth Hd of the liquid calculated in step S4 is larger than that in the embodiment described above, the maximum acceleration Amax(Hd) calculated in step S5 is large based on the relational expression F(H) between the depth H of the liquid and the maximum acceleration Amax shown in FIG. 7. Therefore, the change in the velocity of the fluid vessel A during carrying the fluid vessel A is drastic as shown in FIG. 13*a*, and the movement time T of the fluid vessel A from the starting point (Xs, Ys) to the ending point (Xe, Ye) is shortened.

Figure 13B:
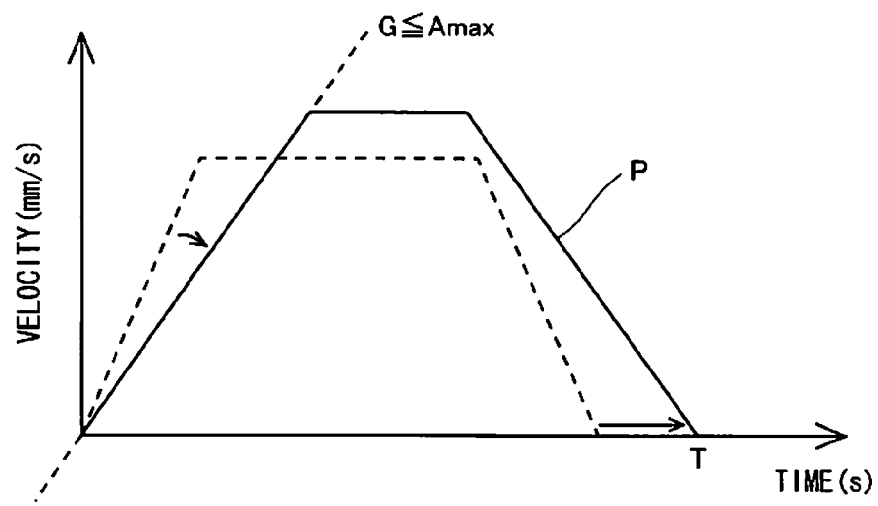
FIG. 13b is a view showing in a graph a change in velocity of the fluid vessel in the case where the depth of the liquid is small.

In contrast, in the case where the depth Hd of the liquid calculated in step S4 is smaller than that in the embodiment described above, the change in the velocity of the fluid vessel A during carrying the fluid vessel A is gradual as shown in FIG. 13*b*, and the movement time T of the fluid vessel A from the starting point (Xs, Ys) to the ending point (Xe, Ye) is extended.

3. Modification 3-1. First Modification

In the carrying device 100, as the detection device detecting depth information, the weight sensor 7 may be replaced with an imaging device. In such a case, as means for deriving the depth Hd of the liquid, the depth calculation unit 84 is replaced with an image processing unit.

In particular, the imaging device images the liquid in the fluid vessel A from a side, whereby an image showing the bottom surface of the fluid vessel A and a surface of the liquid is used as the depth information. The image which is the depth information is subjected to image processing by the image processing unit, whereby the depth Hd of the liquid is derived based on the bottom surface of the fluid vessel A and the surface of the liquid.

In order to control the carrying device 100 in this modification, in step S1, the depth information (the image) is acquired from the imaging device described above. And then in step S4, the image acquired in step S1 is subjected to the image processing by the image processing unit, whereby the depth Hd of the liquid is derived.

Here, in order for the image processing unit to easily recognize the bottom surface of the fluid vessel A and the surface of the liquid in step S4, the liquid may be stained to red with phenol red or the like, for example.

With the carrying device 100 of this modification, it is possible to derive the depth Hd of the liquid from only the image which is the depth information. Therefore, it is not necessary to input the type of the fluid vessel A and the type of the liquid contained in the fluid vessel A in step S2, while it is not necessary to read out the bottom surface area and the weight of the fluid vessel A and the density of the liquid in step S3.

3-2. Second Modification

Figure 14A:
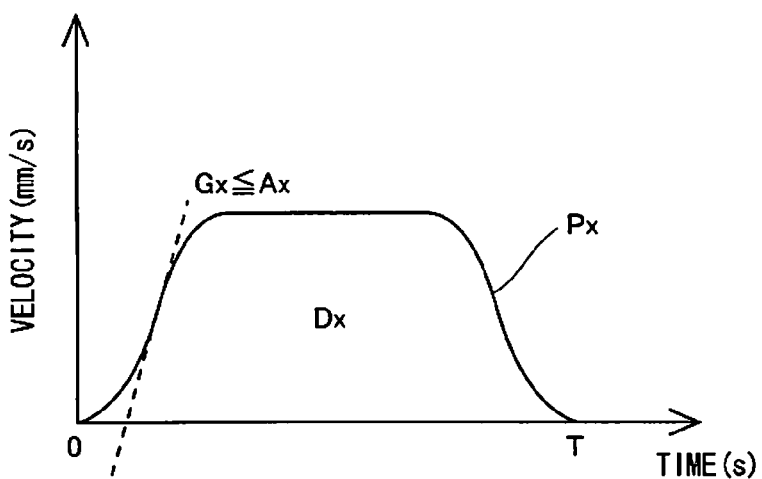
FIG. 14a is a view showing in a graph another example of the speed control pattern in the X-axis direction.
Figure 14B:
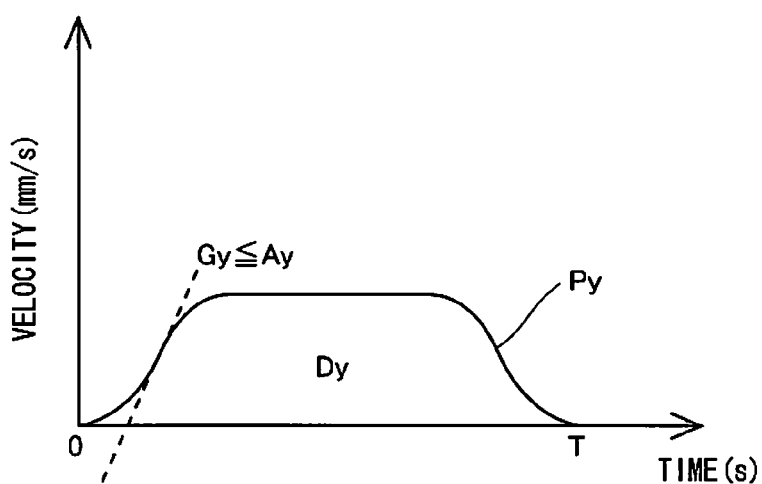
FIG. 14b is a view showing in a graph another example of the speed control pattern in the Y-axis direction.

FIG. 14 are views showing in graphs other examples of the speed control pattern Px in the X-axis direction and the speed control pattern Py in the Y-axis direction which are formed by the pattern preparing unit 86 of the control device 8. In the carrying device 100 according to the embodiment described above, the speed control pattern Px in the X-axis direction and the speed control pattern Py in the Y-axis direction have the trapezoidal shape. However, they may have an S-shape as shown in FIGS. 14a and 14b.

In the case where the speed control pattern has the S-shape, the inclination of the pattern is the maximum at an inflection point. Therefore, in the pattern preparing unit 86 of the control device 8 (step S6), the speed control pattern Px in the X-axis direction is prepared so that an inclination Gx at the inflection point is not greater than the X-axis direction component Ax of the maximum acceleration vector A as shown in FIG. 14a, while the speed control pattern Py in the Y-axis direction is prepared so that an inclination Gy at the inflection point is not greater than the Y-axis direction component Ay of the maximum acceleration vector A as shown in FIG. 14b.

Figure 15:
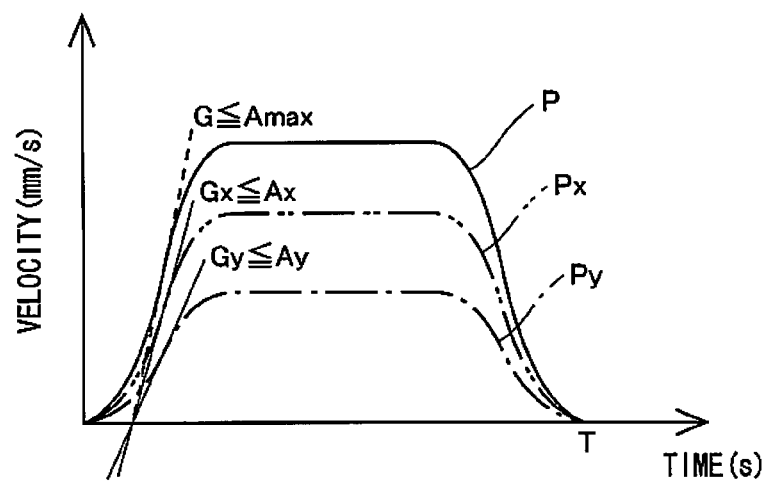
FIG. 15 is a view showing in a graph a change in velocity of the fluid vessel in the direction from the starting point to the ending point.

Then in step S7, the carry command unit 87 gives a command to the carrying mechanism 1 based on the speed control patterns Px, Py shown in FIGS. 14a and 14b, whereby the velocity of the fluid vessel A during carrying the fluid vessel A changes in the S-shape in accordance with a graph P shown in FIG. 15.

Also in the case where the speed control pattern is in the S-shape, the speed control pattern Px in the X-axis direction is prepared so that the maximum value Gx of the inclination thereof is not greater than the X-axis direction component Ax of the maximum acceleration vector A, while the speed control pattern Py in the Y-axis direction is prepared so that the maximum value Gy of the inclination thereof is not greater than the Y-axis direction component Ay of the maximum acceleration vector A. Therefore, the maximum value G of the acceleration in the direction from the starting point (Xs, Ys) to the ending point (Xe, Ye) does not exceed the maximum acceleration Amax(Hd) calculated in step S5. Accordingly, even in the case where the fluid vessel A is carried, the cell is hardly removed from the bottom surface of the fluid vessel A.

Figure 16A:
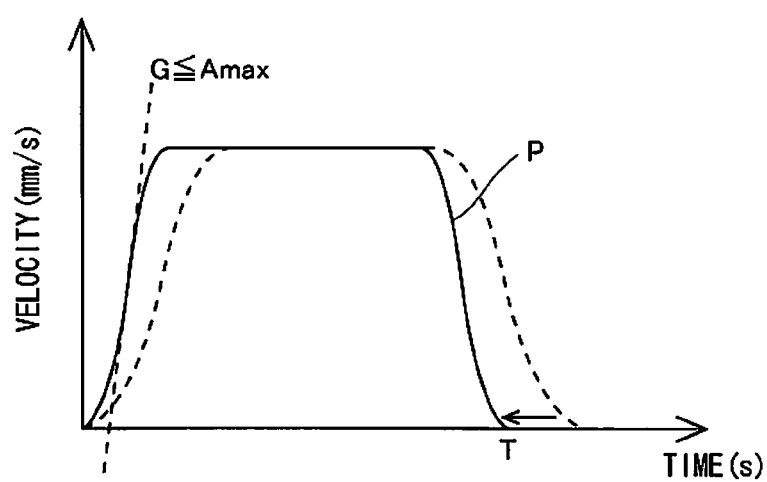
FIG. 16a is a view showing in a graph a change in velocity of the fluid vessel in the case where the depth of the liquid is large.

Also, in the case where the speed control pattern is in the S-shape, in the case where the depth Hd of the liquid calculated in step S4 is larger than that in the other example described above, the maximum acceleration Amax(Hd) calculated in step S5 is large based on the relational expression F(H) between the depth H of the liquid and the maximum acceleration Amax shown in FIG. 7. Therefore, the change in the velocity of the fluid vessel A is drastic as shown in FIG. 16a, and the movement time T of the fluid vessel A from the starting point (Xs, Ys) to the ending point (Xe, Ye) is shortened. Accordingly, it is possible to carry the fluid vessel A quickly.

Figure 16B:
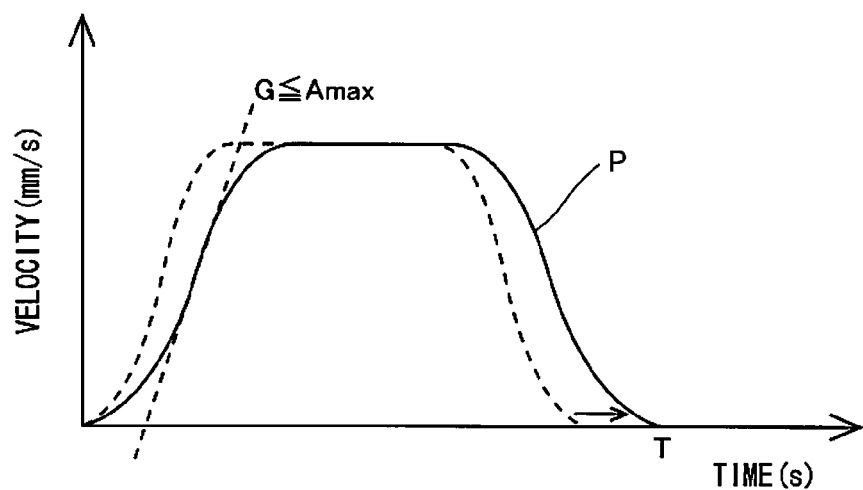
FIG. 16b is a view showing in a graph a change in velocity of the fluid vessel in the case where the depth of the liquid is small.

In contrast, in the case where the depth Hd of the liquid calculated in step S4 is smaller than that in the other example described above, the change in the velocity of the fluid vessel A is gradual as shown in FIG. 16b, and the movement time T of the fluid vessel A from the starting point (Xs, Ys) to the ending point (Xe, Ye) is extended.

In the case where the speed control pattern is in the S-shape, inhibited is an impact to the fluid vessel A due to a drastic change in the velocity, whereby the fluid vessel A is carried more smoothly than in the case where the speed control pattern is in the trapezoidal shape.

The present invention is not limited to the foregoing embodiment in construction but can be modified variously within the technical range set forth in the appended claims. For example, the relational expression F(H) between the depth H of the liquid and the maximum acceleration Amax is not limited to the one passing through the original as shown in FIG. 7, but may be one with a y-intercept which is other than zero.

Also, in the embodiment described above, the depth information Id is detected by the detection device of the weight sensor 7 or the imaging device, and the depth information Id is acquired from the detection device by the information acquisition unit 81 of the control device 8. However, the depth information Id may be detected by a device other than the carrying device 100, and then given to the control device 8 by the information inputting unit 9, for example.

Further, in the embodiment described above, the depth Hd of the liquid is calculated from the depth information Id by the depth calculation unit 84, and the maximum acceleration Amax (Hd) is calculated from the depth Hd of the liquid by the computing unit 85. However, the maximum acceleration Amax(Hd) may be directly calculated from the depth information Id by the computing unit 85 without providing the depth calculation unit 84, for example.

The preparation of the speed control patterns Px, Py by the pattern preparing unit 86 described above may be executed by the computing unit 85.

Further, the shape of the speed control patterns Px, Py in the X-axis direction and the Y-axis direction is not limited to the trapezoidal shape or the S-shape, but may be other shapes. The detection device for detecting the depth information Id is not limited to the weight sensor or the imaging device described above. The carrying device 100 described above can be applied not only to the observation unit but also various kinds of devices.

What is claimed is:

1. A carrying device comprising carrying mechanism carrying a fluid vessel containing a liquid, a detection device detecting depth information changing in accordance with a depth of the liquid in the fluid vessel, and a control device controlling the carrying mechanism, wherein the control device comprises: an information acquisition unit acquiring the depth information detected by the detection device; a computing unit calculating a maximum value of an acceleration which can be given to the fluid vessel during carrying the fluid vessel based on the depth information acquired by the information acquisition unit; and a carry command unit giving the carrying mechanism a command for carrying the fluid vessel at an acceleration of not greater than the maximum value of the acceleration, and the computing unit calculates a greater value as the maximum value of the acceleration as the depth of the liquid in the fluid vessel increases, and calculates a smaller value as the maximum value of the acceleration as the depth of the liquid in the fluid vessel decreases.

2. The carrying device according to claim 1, wherein the detection device comprises a weight sensor, and a weight of the liquid measured by the weight sensor is detected as the depth information.

3. The carrying device according to claim 1, wherein the detection device comprises an imaging device, and the imaging device images the liquid in the fluid vessel from a side, whereby an image showing a bottom surface of the fluid vessel and a surface of the liquid is detected as the depth information.

4. The carrying device according to claim 1, wherein the carrying mechanism carries the fluid vessel along a plane comprising a first axis and a second axis intersecting the first axis, and, in the case of carrying the fluid vessel between two points on the plane from one point to the other point, based on a first axis direction component and a second axis direction component of an acceleration vector from the one point to the other point having a magnitude of the maximum value of the acceleration, the carry command unit of the control device gives the carrying mechanism a command for carrying the fluid vessel in a first axis direction at the acceleration of not greater than the first axis direction component, while carrying the fluid vessel in a second axis direction at the acceleration of not greater than the second axis direction component.

5. A control device for controlling a carrying mechanism carrying a fluid vessel containing a liquid, comprising an information acquisition unit acquiring depth information changing in accordance with a depth of the liquid in the fluid vessel, a computing unit calculating a maximum value of an acceleration which can be given to the fluid vessel during carrying the fluid vessel based on the depth information acquired by the information acquisition unit, and a carry command unit giving the carrying mechanism a command for carrying the fluid vessel at an acceleration of not greater than the maximum value of the acceleration, the computing unit calculates a greater value as the maximum value of the acceleration as the depth of the liquid in the fluid vessel increases, and calculates a smaller value as the maximum value of the acceleration as the depth of the liquid in the fluid vessel decreases.

6. A program for controlling a carrying mechanism carrying a fluid vessel containing a liquid, the program making a computer acquire depth information changing in accordance with a depth of the liquid in the fluid vessel, calculate a maximum value of an acceleration which can be given to the fluid vessel during carrying the fluid vessel based on the depth information acquired, and give the carrying mechanism a command for carrying the fluid vessel at an acceleration of not greater than the maximum value of the acceleration, the computer calculating a greater value as the maximum value of the acceleration as the depth of the liquid in the fluid vessel increases, and calculating a smaller value as the maximum value of the acceleration as the depth of the liquid in the fluid vessel decreases.

* * * * *